(12) United States Patent
McDonald (10) Patent No.: US 8,758,946 B2
(45) Date of Patent: Jun. 24, 2014

(54) ELECTROLYTE SUITABLE FOR USE IN A LITHIUM ION CELL OR BATTERY

(75) Inventor: Robert C. McDonald, Stow, MA (US)

(73) Assignee: Giner, Inc., Newton, MA (US)

( * ) Notice: Subject to any disclaimer, the term of this patent is extended or adjusted under 35 U.S.C. 154(b) by 1174 days.

(21) Appl. No.: 11/973,293

(22) Filed: Oct. 4, 2007

(65) Prior Publication Data

US 2008/0193855 A1     Aug. 14, 2008

Related U.S. Application Data

(60) Provisional application No. 60/849,340, filed on Oct. 4, 2006.

(51) Int. Cl.
*H01M 6/16*     (2006.01)

(52) U.S. Cl.
USPC ........................... 429/327; 429/326; 429/340

(58) Field of Classification Search
CPC ............................................. H01M 2300/0034
USPC .................. 429/326, 330, 332, 338, 340, 327
See application file for complete search history.

(56) References Cited

U.S. PATENT DOCUMENTS

| | | | |
|---|---|---|---|
| 3,044,865 A | 7/1962 | Rosen | |
| 6,465,135 B1 * | 10/2002 | Nishimura et al. | 429/309 |
| 2002/0034060 A1 * | 3/2002 | Konuma et al. | 361/326 |
| 2005/0100795 A1 * | 5/2005 | Utsugi et al. | 429/326 |

FOREIGN PATENT DOCUMENTS

JP     2002-409728     *  2/2002 ........... C07D 333/46

OTHER PUBLICATIONS

Xu et al. ("Sulfone-Based Electrolytes for Lithium-Ion Batteries", Journal of the Electrochemical Society, 149 (7) A920-A926, 2002).*
McDonald, "Sources of Pressure in Lithium Thionyl Chloride Batteries," J. Electrochem. Soc., 129(11):2453-7 (1982).
Ein-Eli et al., "Li-Ion Battery Electrolyte Formulated for Low-Temperature Applications," J. Electrochem. Soc., 144(3):823-9 (1997).
McDonald et al., "Low Temperature Characteristics of Lithium/ Thionyl Chloride Cells," Progress in Batteries & Solar Cells, 5:294-8 (1984).
Xu et al., "Weakly Coordinating Anions, and the Exceptional Conductivity of Their Nonaqueous Solutions," Electrochemical and Solid-State Letters, 4(1):E1-4 (2001).
Xu et al., "Sulfone-Based Electrolytes for Lithium-Ion Batteries," J. Electrochem. Soc., 149(7): A920-6 (2002).
Smart et al., "Electrolytes for Low-Temperature Lithium Batteries Based on Ternary Mixtures of Aliphatic Carbonates," J. Electrochem. Soc., 146(2):486-92 (1999).

* cited by examiner

*Primary Examiner* — Barbara Gilliam
*Assistant Examiner* — Steven Scully
(74) *Attorney, Agent, or Firm* — Kriegsman & Kriegsman (57) ABSTRACT

Electrolyte suitable for use in a lithium ion cell or battery. According to one embodiment, the electrolyte includes a fluorinated lithium ion salt and a solvent system that solvates lithium ions and that yields a high dielectric constant, a low viscosity and a high flashpoint. In one embodiment, the solvent system includes a mixture of an aprotic lithium ion solvating solvent and an aprotic fluorinated solvent.

11 Claims, 6 Drawing Sheets

Fluorine NMR spectrum of Synthesized 3-F- Monofluorosulfolane showing characteristic hyperfine splitting pattern

FIG. 1

Fluorine NMR spectrum of Synthesized 3-F- Monofluorosulfolane

FIG. 2

Fluorine NMR spectrum of Synthesized 3-F- Monofluorosulfolane showing characteristic hyperfine splitting pattern

FIG. 3

Variation of 0.5M LiPF$_6$ conductivity in mixtures of EC, PC and TFEA

*FIG. 4*

Variation of 0.5M LiPF$_6$ conductivity in mixtures of EC, PC and PFOS

FIG. 5

Variation of 0.5M LiPF$_6$ conductivity in mixtures of EC, PC and TFP

FIG. 6

ELECTROLYTE SUITABLE FOR USE IN A LITHIUM ION CELL OR BATTERY

CROSS-REFERENCE TO RELATED APPLICATIONS

The present application claims the benefit under 35 U.S.C. 119(e) of U.S. Provisional Patent Application Ser. No. 60/849,340, filed Oct. 4, 2006, the disclosure of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. NNC04CA58C awarded by NASA.

BACKGROUND OF THE INVENTION

The present invention relates generally to electrolytes suitable for use in a lithium ion cell or battery and relates more particularly to a novel electrolyte suitable for use in a lithium ion cell or battery.

Growing demands for lightweight, portable, rechargeable batteries have generated a need for rechargeable lithium ion batteries with higher performance, longer life, improved safety and a wide operating temperature range of −40° C. to +70° C. Current lithium ion battery technology is limited by the deterioration of the battery electrolyte and the electrolyte-electrode interface as a result of elevated operating and storage temperatures. Traces of water, alcohols or other protic solvents can elevated to pressure build-up from hydrogen generation (see McDonald, "Sources of Pressure in Lithium Thionyl Chloride Batteries," *J. Electrochem. Soc.*, 129(11): 2453-7 (1982), which is incorporated herein by reference). Most of the more common electrolytes use flammable solvents with low flash-points. Operation at low temperatures is limited by diminishing conductivity and phase separation, which can lead to electrode and electrolyte deterioration during extended cycling.

Unfortunately, the higher conductivities for common non-aqueous, polar co-solvents used in electrolytes for lithium ion batteries tend to be derived from solvent systems which include straight chain or cyclic ethers, which have very low flash points and which can severely limit the upper temperature for storage and operation of the battery. The use of cyclic carbonates like propylene carbonate (PC) and ethylene carbonate (EC) improves the situation with higher dielectric constants and flashpoints, but the low-temperature conductivity for most of the aprotic, organic solvents studied so far severely limits power density. In addition, low flash point solvents can contribute to fire hazards associated with equipment failure in manned flights. One of the best low-temperature electrolytes examined so far consists of a 3:1 mix of methyl formate and ethylene carbonate with $LiAsF_6$, with a conductivity of 0.0084 S/cm reported at −40° C. (see Ein-Eli et al., "Li-Ion Battery Electrolyte Formulated for Low-Temperature Applications," *J. Electrochem. Soc.*, 144(3):823-9 (1997), which is incorporated herein by reference). This conductivity approaches that measured for some very conductive inorganic electrolytes, like 1.0M $LiAlCl_4$ in thionyl chloride ($SOCl_2$), which is 0.013 S/cm at −40° C. (see McDonald et al., "Low Temperature Characteristics of Lithium/Thionyl Chloride Cells, Progress in Batteries & Solar Cells, 5:294-8 (1984), which is incorporated herein by reference).

Considerable effort has been expended over the last 40 years to develop electrolytes for lithium ion batteries using lithium salts in various aprotic solvents. Conductivities as high as 20 $mS/cm^2$ have been measured for inorganic electrolytes like $LiAlCl_4$ in thionyl chloride, but these are not suitable for rechargeable batteries. Organic solvents are preferred for rechargeable batteries; however, most of the solvents with good lithium ion mobility have low flash points or have too narrow an electrochemical window of stability. This stability is essential to avoid oxidative or reductive decomposition of the material on the electrode surfaces during the battery charging and deep discharging. Higher electrolyte conductivities decrease battery internal resistance, increasing available power, while higher flashpoints decrease the risk of fire in a battery if exposed to excessive heat. Table I lists some of the properties for certain liquid electrolyte systems.

TABLE 1

| Compound | Formula | Dipole moment (Debye) | Freezing Point (° C.) | Boiling Point (° C.) | Flashpoint (° C.) | Acceptor No. |
|---|---|---|---|---|---|---|
| Butylene Carbonate |  | 5.28 | −45 | 251 | 135 | 0.23 |
| Propylene Carbonate |  | 4.98 | −48.8 | 242 | 131 | 0.32 |
| Ethylene Carbonate |  | 4.8 | ca 20 | 248 | 160 | 0.32 |

Unfortunately, most liquid electrolyte systems can be considered flammable, with the open chain ether types somewhat more flammable that the organic carbonates. In addition, electrolytes using lithium perchlorate, $LiClO_4$, are rarely used because of the potential for rapid exothermic decomposition under certain conditions. The use of lithium hexafluoroarsente, $LiAsF_6$, is also avoided because of concerns about arsenic toxicity in consumer products. Most commercial lithium batteries now use lithium hexafluorophosphate, $LiPF_6$, which has reasonable stability and environmental compatibility.

In "LiBOB and Its Derivatives: Weakly Coordinating Anions, and the Exceptional Conductivity of Their Nonaqueous Solutions," *Electrochemical and Solid State Letters*, 4(1): E1-E4 (2001), which is incorporated by reference, Xu et al. reviewed a number of electrolyte salts which showed good conductivity down to −40° C., but had to choose the highly flammable solvent dimethoxyethane (DME). In practical battery electrolytes, combinations of solvents are often used to provide a wide operating temperature range, maximum ionic conductivity and the desired cathodic stability. In addition, electrolytes must provide a protective passivation film on the anode during early charge cycles, in order to limit continued anodic decomposition of the solvent. Their conductivities tend to be somewhat lower than the pure solvents, used alone.

Other documents of interest include Xu et al., "Sulfone-Based Electrolytes for Lithium-Ion Batteries," *Journal of The Electrochemical Society*, 149(7):A920-6 (2002), and Smart et al., "Electrolytes for Low-Temperature Lithium Batteries Based on Ternary Mixtures of Aliphatic Carbonates," *Journal of The Electrochemical Society*, 146(2):486-92 (1999), both of which are incorporated herein by reference.

SUMMARY OF THE INVENTION

It is an object of the present invention to provide a novel electrolyte suitable for use in a lithium ion cell or battery.

It is another object of the present invention to provide an electrolyte as described above that overcomes at least some of the disadvantages described above in connection with existing electrolytes used in lithium ion cells or batteries.

Therefore, according to one aspect of the invention, there is provided an electrolyte suitable for use in a lithium ion cell or battery, said electrolyte comprising: (a) a lithium salt; and (b) a solvent system, the solvent system comprising (i) first aprotic solvent, said first aprotic solvent being a lithium ion solvating solvent and (ii) a second aprotic solvent, said second aprotic solvent being a fluorinated solvent.

The present invention is also directed at an electrochemical cell, such as a lithium ion cell or battery, including the above-described electrolyte.

Various other objects, features and advantages of the present invention will be set forth in part in the description which follows, and in part will be obvious from the description or may be learned by practice of the invention. In the description, reference is made to the accompanying drawings which form a part thereof and in which is shown by way of illustration one or more embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

The present invention is directed at a new electrolyte suitable for use in lithium ion cells or batteries. As will be discussed further below, the electrolyte of the present invention comprises (a) a lithium salt; and (b) a solvent system, the solvent system including (i) a first aprotic solvent, said first aprotic solvent being a lithium ion solvating solvent; and (ii) a second aprotic solvent, said second aprotic solvent being a fluorinated solvent.

The aforementioned lithium salt may be a lithium salt of the type conventionally used in an electrolyte for a lithium ion cell or battery. Examples of suitable lithium salts include, but are not limited to, fluorinated lithium salts, such as $LiBF_4$, $LiAsF_6$ and $LiPF_6$.

The solvent system of the present invention includes at least a first aprotic solvent and a second aprotic solvent. The first aprotic solvent has a sufficiently high dipole moment to solvate the lithium salt and may be an aprotic solvent of the type conventionally used as a lithium ion solvating solvent in an electrolyte for a lithium ion cell or battery. Examples of suitable solvents include, but are not limited to, ethylene carbonate, propylene carbonate, and butylene carbonate.

The second aprotic solvent is a fluorinated solvent that serves to raise the flashpoint of the electrolyte, as well as having a high dipole moment and low viscosity. Preferably, the second aprotic solvent is at least a partially fluorinated ring structure containing and opposite to a sulfoxide group. More preferably, the second aprotic solvent is a compound of the general formula wherein n=1 or 2; $R_1$=H or F; $R_2$=H or F; $R_3$=H or F; and $R_4$=H or F, with at least one of $R_1$, $R_2$, $R_3$ and $R_4$, preferably at least one of $R_2$ and $R_3$, being F. Examples of compounds of the above general formula include, but are not limited to, 3-fluorosulfolane, 3-fluorosulfolene, c is 3,4-difluorosulfolene, and 3,4-difluorosulfolane. Solvents of the above formula may have a molecular dipole moment in excess of 4 Debye.

3-Fluorosulfolane may be prepared in the manner described in U.S. Pat. No. 3,044,865, which is incorporated by reference, or may be prepared by the pathway described below.

When a hydroxyl group is placed in the desired location, it can be replaced with fluorine using dialkylaminosulfur trifluoride (DAST) or HF or other fluorine donors. The hydroxyl compound was obtained from Sigma-Aldrich Library of Rare Chemicals. Using methyl sulfone, sulfolene and the Aldrich material, a Thin Lay Chromatography (TLC) method was discovered which showed the Aldrich material to be at least 2 components. ΔRf between sulfolane and the hydroxyl compound was about 0.2, suggesting that the TLC method could be converted into a flash chromatography method. High-Performance Liquid Chromatography (HPLC) was also applied to analyze the hydroxyl material with the following results:

| | |
|---|---|
| $RT_1$ | 3.553 min |
| Area % | 92.4 |
| $RT_2$ | 3.868 |
| Area % | 7.6 |
| $RT_{sulfolane}$ | 3.905 min |

Thus the second constituent in the hydroxyl compound appears to be unreacted sulfolane. Flash Chromatography was also applied to the separation of the Aldrich material giving:

| | |
|---|---|
| $RT_1$ | 3.548 min |
| Area % | 92.4 |
| $RT_2$ | 3.701 min |
| Area % | 7.6 |
| $RT_{sulfolane}$ | 3.905 min |

The fluorination was carried out by taking up 1.08 g of the Aldrich hydroxyl material in anhydrous methylene chloride and adding drop wise the DAST agent (~4 equivalents while stirring at −47° C. Work up gave a dark liquid. HPLC analysis showed no residual 3-hydroxysulfolane present, but rather a mixture of two new compounds.

Figure 1:
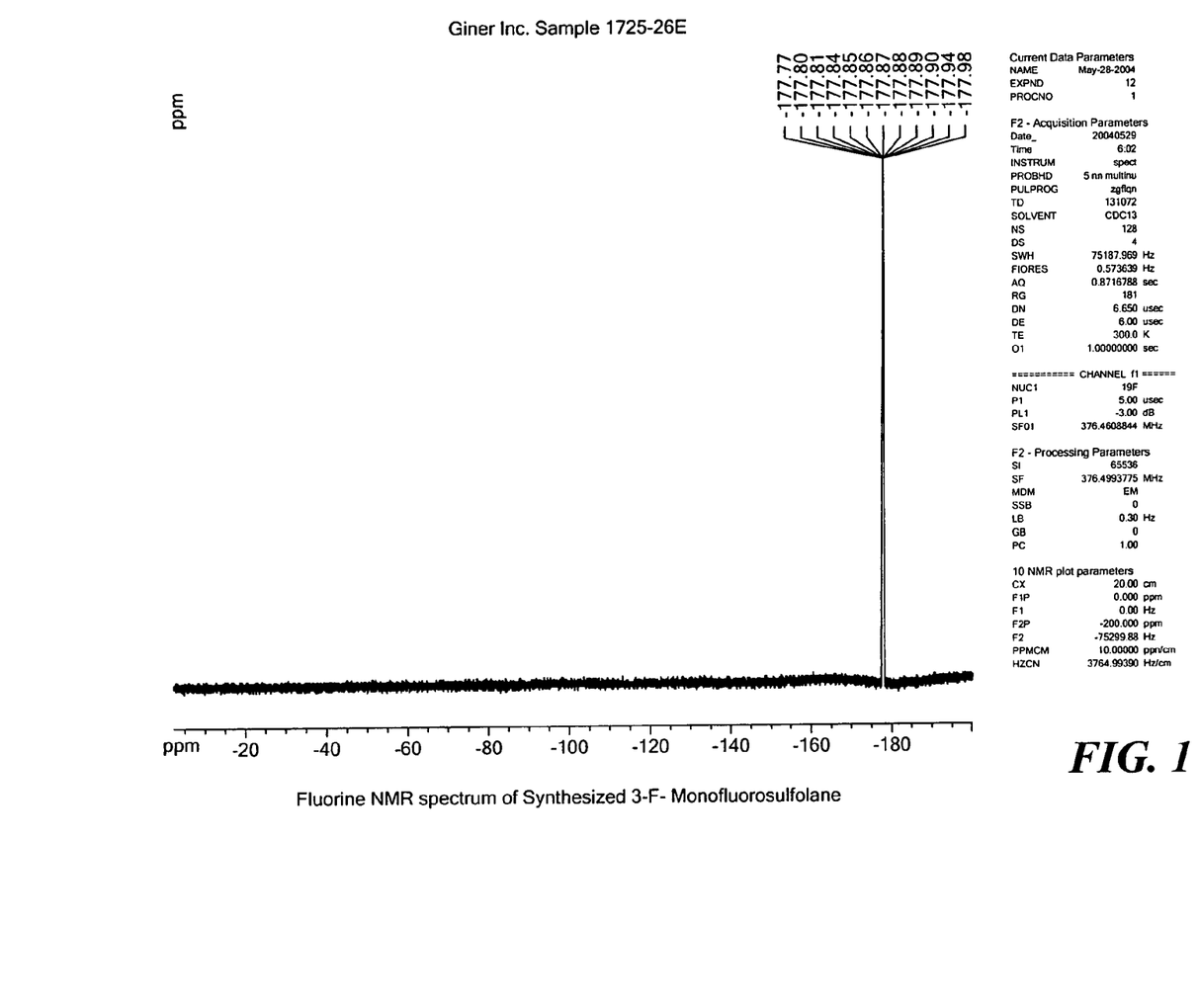
FIGS. 1 and 2 are NMR spectra of 3-fluorosulfolane.
Figure 2:
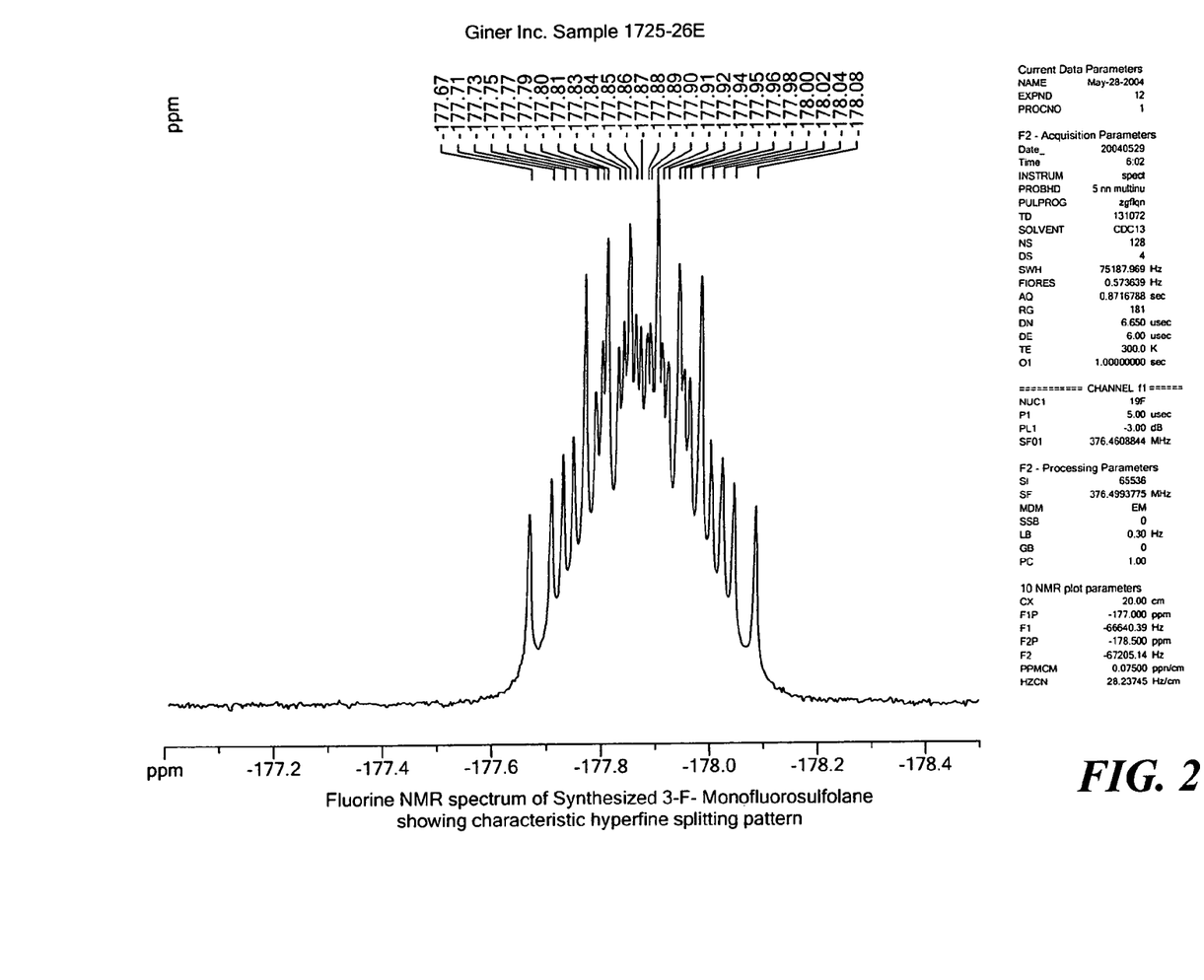

The resulting straw colored liquid was shown to run at a different time on the HPLC column from the hydroxyl precursor, indicating the formation of a new compound 3-fluorosulfolane (3-fluorotetramethylene sulfone). Fluorine NMR showed a single strong fluorine peak. The splitting patterns shown in FIGS. 1 and 2 below are consistent with fluorine bonded at the 3 position in sulfolane.

An alternative synthetic route for a solvent of the general formula above involves addition of hydrofluoric acid (HF) across the double bond in 3,4 Sulfolene. In this approach, the HF is typically provided to the reaction in the form of a weak donor-acceptor complex to active the molecule and prevent $H_2F_2$ dimer formation which can slow down the reaction rate.

Another suggested pathway starts with tetrahydrothiophene-3-one and uses a 3-step process to make the 3-F sulfolane or sulfoxide or a mixture of these. In addition, sulfolene was purchased with the belief that we may be able to add water across the double bond with acid and add fluorine at the hydroxyl position using HF:Pyridine complex.

By careful control of synthetic conditions, either the mono- or the dioxide forms can be produced, with the mono-oxide having the highest dipole moment.

Preferably, the second aprotic solvent is present in the solvent system at a percentage of about 20-60%, more preferably about 30-50%.

The solvent system may further include one or more additional aprotic solvents, such as largely or completely fluorinated hydrocarbon liquids. Examples of such liquids include, but are not limited to, 2,3-dihydrodecafluoropentane; 1,1,1-trifluoropentanedione; trifluoroethyl acetate; and 1,2-hexafluoropentane-3,4-dione. The fluorinated sulfolanes and sulfolenes and certain others of the above fluorocarbon cosolvent group form donor-acceptor complexes with fluorinated salts like $LiPF_6$, which, in turn, are soluble in fluorinated cosolvents, resulting in enhanced dissociation of the lithium salt in solution, better conductivity, enhanced miscibility, lower freezing point, lower viscosity, higher dielectric constant and reduced flammability.

The electrolyte of the present invention may be used as a low-flammable, lithium ion-conducting electrolyte. This electrolyte exhibits conductivities down to −40° C. and low viscosities down to −71° C. The electrolyte does not freeze or salt out down to −71° C. These results strongly suggest that the present electrolyte is capable of providing the necessary ionic conductivity down to −40° C. for tactical military power supply and certain industrial needs.

In addition, the present electrolyte shows compatibility with metallic lithium, with no major breakdown in contact with metallic lithium at +100° C. during 1 hour storage. High anodic voltage limits are shown for the electrolyte, a requirement for chemical stability of the electrolyte in contact with charged cathode materials, like $Li_{0.5}CoO_2$. The electrolyte has low vapor pressures with flashpoints above +60° C. Thus, the electrolyte shows promise for safe operation at both low and high temperatures.

The disclosed invention is not limited to liquid lithium ion electrolytes and the high dipole moments solvents can also be combined in a gel or polymer electrolyte where this provides ease-of-manufacturing or dimensional stability. Examples of polymers that may be used to form a gel or solid electrolyte include polyethylene oxide and polyvinylidene fluoride.

Figure 3:
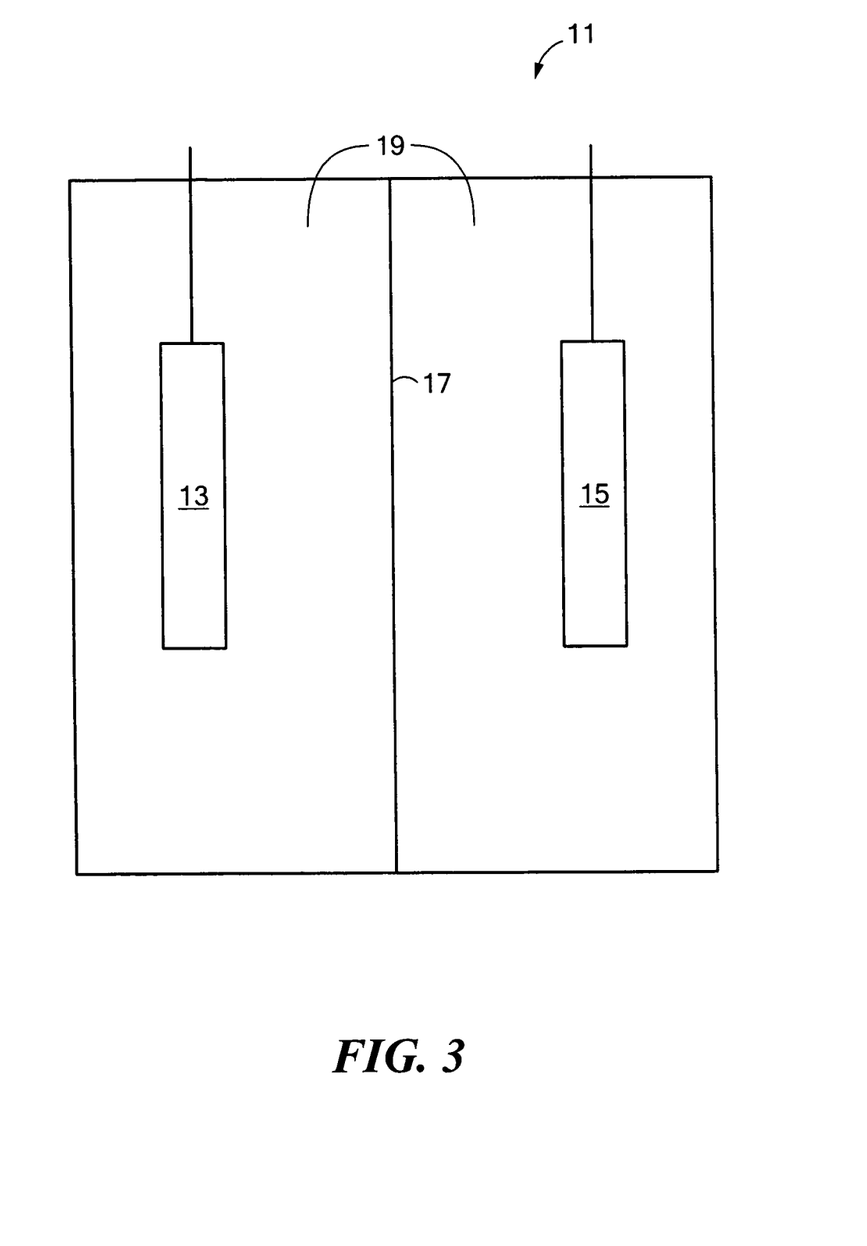
FIG. 3 is a schematic diagram of a battery that includes the electrolyte of the present invention.

The present invention is also directed at a lithium ion cell or battery that includes the above-described electrolyte. An example of such a battery is schematically shown in FIG. 3 and is represented generally by reference numeral 11. Battery 11 includes an anode 13, a cathode 15, a separator 17, and an electrolyte 19. Anode 13 may be a conventional carbon anode. Cathode 15 may be a conventional lithium cobalt oxide cathode. Separator 17 may be conventional, and electrolyte 19 is the electrolyte of the present invention.

The following examples are provided for illustrative purposes only and are in no way intended to limit the scope of the present invention:

EXAMPLE 1

Representative members of the claimed electrolyte mixtures were examined as they cooled to the temperature of −71° C. obtained by placing a tube with the electrolyte into a dry ice/acetone mix. The observed freezing point and appearance of the electrolyte at this low temperature are given in Table II. As can be seen from the table, most of the mixtures are liquid or in gel form at low temperature. The abbreviations for the solvents used in this work are: EC-Ethylene carbonate; PC-Propylene carbonate; BC-Butylene carbonate; PFOS-Perfluoro octane sulfonyl fluoride; PBSF-Perfluoro butane sulfonyl fluoride; Asahiklin 255 azeotrope of $CF_3CF_2CHCl_2$/$CClF_2CF_2CHClF$; Vertrel XF—2,3 Dihrydrodecafluoropentane; TFP—1,1,1-Trifluoropentanedione; $LiPF_6$—Lithium hexafluorophosphate; TFEA—Trifluoroethyl acetate; and HFP—1,2-Hexafluoropenatane-3,4-dione.

TABLE II

Observations made a representative binary and ternary solvent electrolytes compositions from cooling curves using dry ice/acetone as a cooling media

| Composition | Transition T (° C.) | Appearance at −71° C. |
|---|---|---|
| neat PC | −64.0 to −67.2 (FP) | Clear, single viscous liquid phase |
| 0.50M $LiPF_6$ EC-PC-TFEA 2.5-2.5-5.0 | −69.1 to −69.5 (FP) | Clear, single viscous phase |
| 0.25M $LiPF_6$ EC-PC-TFEA 2.5-2.5-5.0 | <−71 | Clear, single low viscosity liquid phase |
| 0.75M $LiPF_6$ EC-PC-TFEA 2.5-2.5-5.0 | <−71 | Clear, single medium viscosity liquid phase |
| 1.00M $LiPF_6$ EC-PC-TFEA 2.5-2.5-5.0 | <−71 | Clear, single high viscosity liquid phase |
| 0.50M LiPF6 BC-PC-TFEA 3-3-4 | −64.9 to −66.8 (FP) | Clear, single low viscosity liquid phase |
| 0.5M LiPF6 EC-PC 5-5 | −63.6 (FP) | Clear, single viscous phase |
| 0.5M LiPF6 TFEA-AK255 5-5 | <−71 | Clear, single very low viscosity liquid phase |
| 0.5M LiPF6 TFEA-FX 5-5 | <−69 | Clear, single very low viscosity liquid phase |
| 0.5M LiPF6 PC-DME 5-5 | <−71 | Clear, single medium viscosity liquid phase |
| 0.5M LiPF6 EC-PC-HFP 2-2-6 | <−69 | Clear, single high viscosity liquid phase |

EXAMPLE 2

Figure 4:
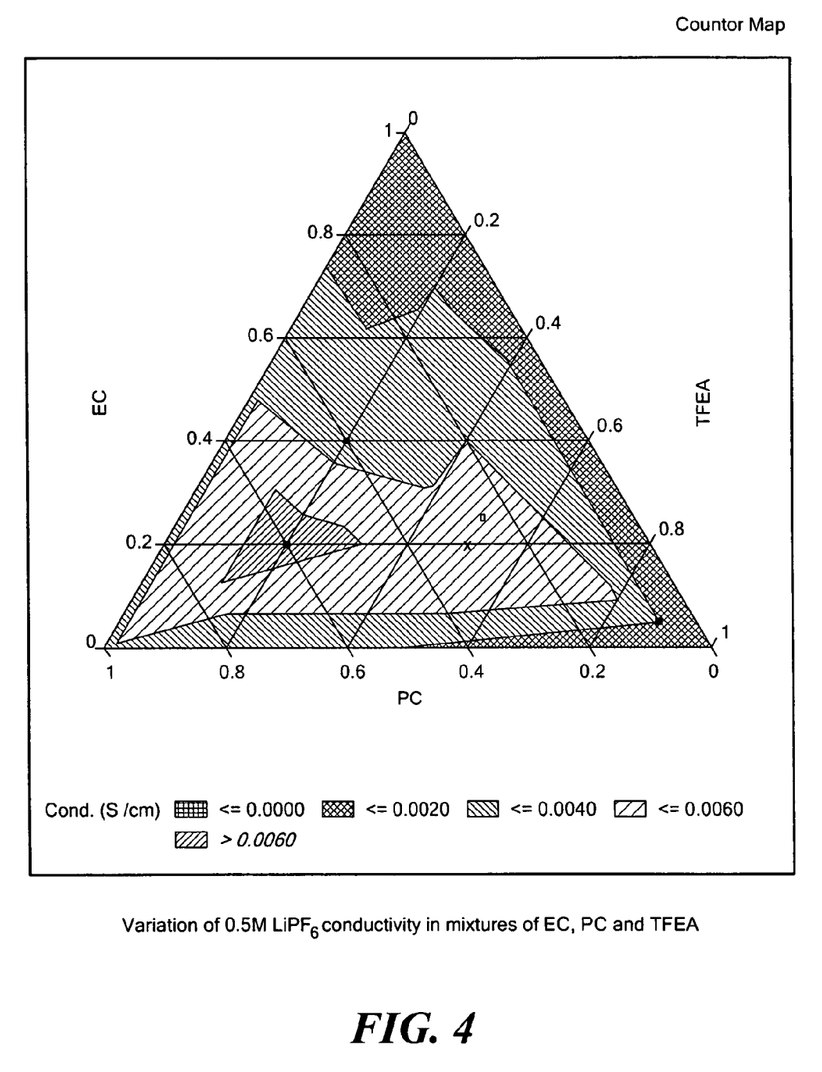
FIGS. 4-6 are ternary conductivity plots as discussed in Example 2.
Figure 5:
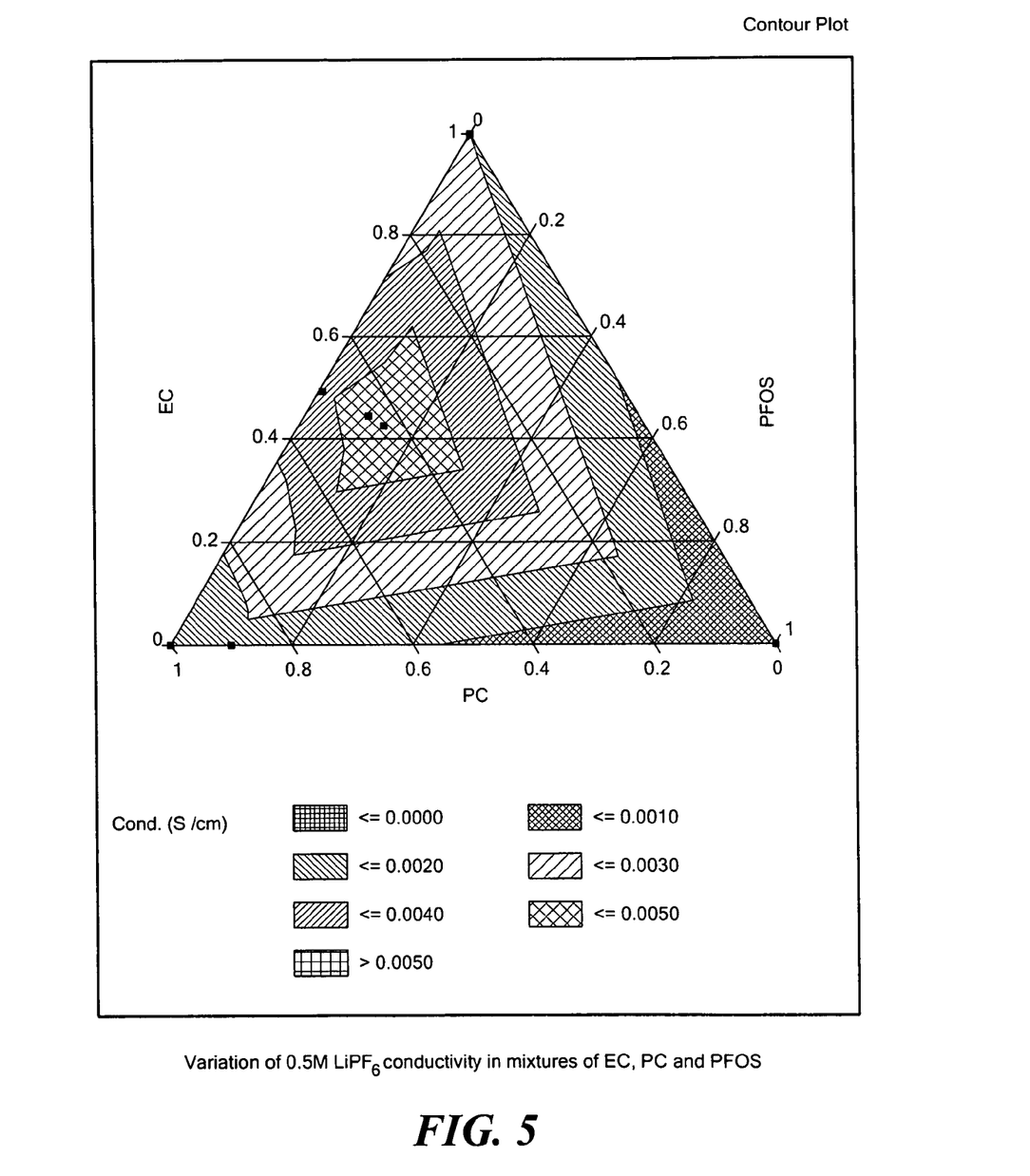
Figure 6:
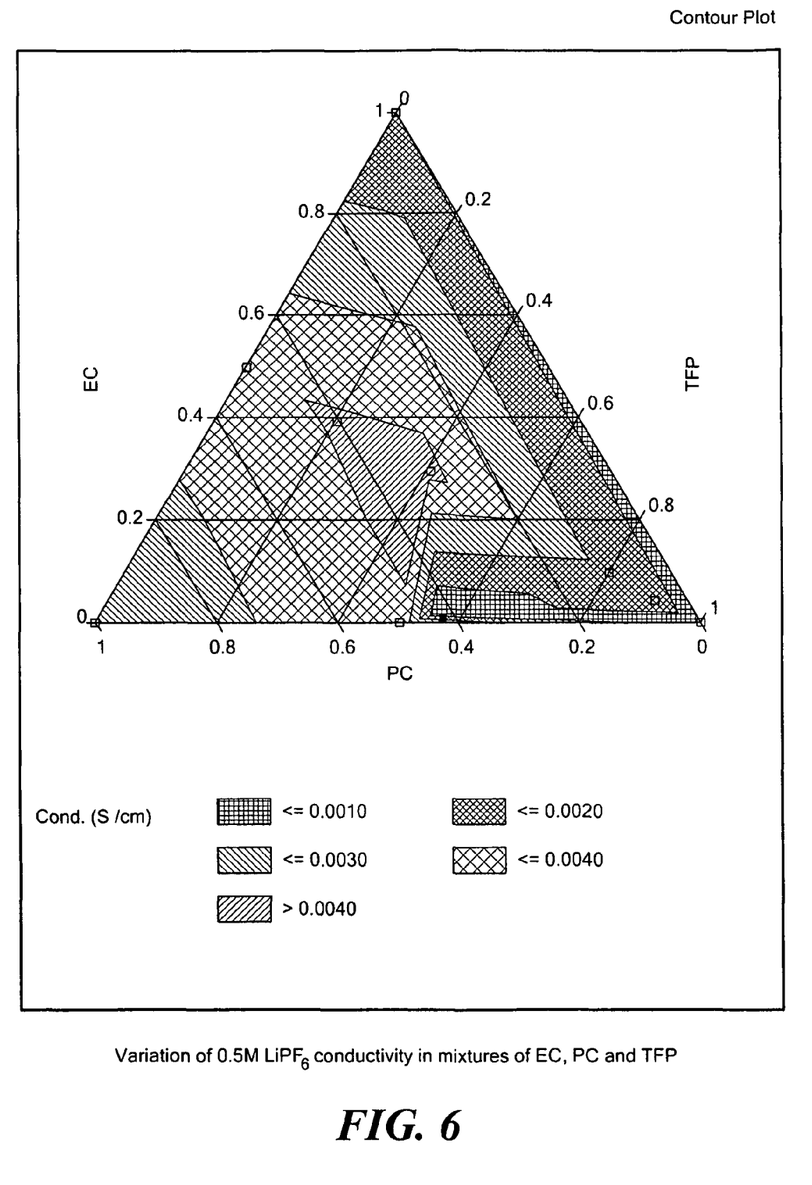

Representative electrolyte mixtures, as claimed, were measured for their ionic conductivity at −40° C. The measurements were made with a 2-point probe at a frequency of 100 kHz. The conductivities are plotted in the form of a ternary plot as shown in FIGS. 3-5. The ternary diagrams show regions of composition where ionic conductivities of 0.004 and 0.006 S/cm can be reached with proper optimization.

EXAMPLE 3

The ionic conductivity of a ternary solvent mix of 25:25:50 EC/PC/TFEA using IM $LiPF_6$ was measured as above and is shown below in Table III to show the conductivity of the invented electrolyte combination as compared with a commercial binary solvent mix with ethylene carbonate and propylene carbonate.

TABLE III

Low-temperature conductivity of ternary solvent mix including trifluoroethyl acetate

| | Conductivity of 1M $LiPF_6$ (S/cm) | |
|---|---|---|
| Temperature (° C.) | 25:25:50 EC/PC/TFEA | 50:50 EC/PC |
| 22 | 0.00388 | 0.00656 |
| 10 | 0.00428 | |
| 0 | 0.00326 | 0.00345 |
| −10 | 0.00235 | |
| −20 | 0.00158 | 0.00136 |
| −30 | 0.000994 | |
| −40 | 0.000569 | 0.00023 |

EXAMPLE 4

Cathodic limitations of electrolytes were evaluated by placing the liquids in sealed glass vials with lithium metal at 22° and 100° C. Table IV lists the candidate electrolytes which underwent this qualitative test. Lithium metal quickly passivates in contact with the disclosed anhydrous organic electrolytes. The thin passive film can consist of a complex mixture of carbonates, oxides and LiF from reaction with the $LiPF_6$ salt. The passive film is typically transparent and prevents further reaction with the metal. In the lithium ion cell, similar passive films are formed on the carbon anode during initial cell cycling.

TABLE IV

Electrolytes place in contact with lithium metal

| Bottle No. | Composition | Initial appearance | Change after 7 days at 22° C. | Change after 1 hr at 100° C. |
|---|---|---|---|---|
| 1 | 0.5M EC-PC-TFP 3-4-4 | very lt. brown | none | none |
| 2 | 0.5M EC-PC 5-5 | yellow brown | lithium darkened | none |
| 3 | EC-PC-PFOS 4.5-4.5-1 | reddish brown | None | Li darkened solution clear |
| 4 | EC-PC-TFEA 1-1-8 | clear | None | Li darkened solution clear |
| 5 | 0.5M LFP TFEA AK-225 5-5 | lt. yellow | lithium darkened | none |
| 6 | 0.5M LFP TFEA-FX 5-5 | clear | none | Li darkened colloidal precipitate |
| 7 | 0.75M LFP EC-PC-HFP | lt. yellow | none | Li darkened solution clear |
| 8 | 0.5M LFP PC/DME | clear | none | none |

None of the electrolytes showed any significant change in the initial color after one week. Two of the solutions showed some darkening of the lithium at room temperature (22° C.), suggesting that traces of water entered the solution during handling. A brief heating of the electrolytes to 100° C. produced additional darkening of the lithium metal in four cases and some colloidal precipitate in the TFEA-FX mixture. Otherwise the solutions were clear. All solutions tended to loose their brownish or yellowish tint, suggesting the initial salt hydrolysis products reacted on the lithium surface.

EXAMPLE 5

Flash points of 5 candidate electrolytes were determined by the Flash Point method ASTM D3828 ("Standard Test Methods for Flash Point by Small Scale Closed Cup Tester"). In this method, relative flammability is determined by placing a flame adjacent to the vapors of a liquid or solution and looking for a flash. The sample is warmed in 1° C. intervals until the flame results in a flash. Although the practical hazard represented by a given liquid is very sensitive to the manner in which it is exposed to heat or open flame, the EPA defines an ignitable substance as one whose flash point is below 60° C. (Characteristics & Lists of Hazardous Waste 40 CFR 261.1). Table V lists flash points of solvents used or proposed for lithium ion battery electrolytes together with the results of Task 5. All of the candidate binary and ternary electrolytes exhibit flash points above 60° C. While some of the candidate fluorocarbons like TFP and HFP have flash points below the EPA ignition definition temperature, the ternary and binary solvent mixes disclosed here are all above 60° C.

TABLE V

Reported flash points for typical lithium ion electrolyte solvents and those measured for electrolytes under development

| Solvent/Mix | Flash Point (° C.) |
|---|---|
| Dimethoxyethane (DME) | −17 |
| methyl acetate (MA) | −9 |
| Ethyl acetate (EA) | −3 |
| Dimethylcarbonate (DMC) | 16 |
| 1,1,1-Trifluoropentane-3,4-dione (TFP) | 21 |
| Diethylcarbonate (DEC) | 31 |
| 1,1,1,5,5,5-Hexafluoropentane-2,4-dione (HFP) | 32 |
| N,N-Dimethylformide (DMF) | 58 |
| 0.5M LiPF$_6$ TFEA/FX 5/5 | 61 |
| 0.5M LiPF$_6$ TFEA/AK225 5/5 | 65 |
| 0.5M LiPF$_6$ EC/PC/TFEA 3/3/4 | 67 |
| 0.5M LiPF$_6$ EC/PC/HFP 3.5/3.5/3 | 68 |
| 0.5M LiPF$_6$ EC/PC/TFP 3.5/3.5/3 | 86 |
| Butylene carbonate (BC) | 119 |
| Ethylene carbonate (EC) | 160 |
| Propylene carbonate (PC) | 275 |
| Perfluorooctanesulfonyl fluoride (PFOS) | ND |
| AK-225 | None |
| Vertrel-XF | None |

EXAMPLE 6

Anode limits were evaluated with Linear Sweep Voltametry (LSV) up to 5.0 V or 6.0 V. The electrolytes were tested in Swagelock® Teflon® "T" fittings. The central Swagelock feedthrough was provided with a lithium reference electrode, the other two with a copper counter electrode and a graphite (99.67% C) carbon working electrode (WE). Using a PAR Model 363 Potentiostat, voltages were swept up to 5 V anodic to lithium at 20-50 mV/sec. Table VI Lists the electrolytes examined and the onset voltage at which current began to increase over background charging of the electrode, which is interpreted as the point where the electrolyte is decomposing.

TABLE VI

Electrolytes examined in LSV up to 5 V at 22° C.

| Electrolyte | Anodic Limiting Voltage | Comments |
|---|---|---|
| 0.5M LiPF$_6$ PC-DME 5-5 | 2.7 | Erosion of graphite WE* |
| 0.5M LiPF$_6$ EC-PC-HFP 2-6-2 | 4.1 | Clear solution. No effect on WE |
| 0.5M LiPF$_6$ EC-PC 5-5 | 3.4 | Some loose graphite in electrode |
| 0.5M LiPF$_6$ EC-PC-TFEA 2-6-2 | >6.0 | Clear solution. No effect on WE |
| 0.5M LiPF$_6$ EC-PC-TFP 3.5-3.5-3 | 4.3 | Clear solution. No effect on WE |
| 0.5M LiPF$_6$ TFEA-FX 7.2-2.5 | 4.5 | Clear solution. No effect on WE |
| 0.5M LiPF$_6$ TFEA-AK225 7.2-2.5 | 3.2 | Clear solution. No effect on WE |

*WE—Working Electrode, CE—Counter Electrode

The relatively low anodic limit of 2.7 V for PC-DME appears to be linked to an interaction with the graphite electrode. The graphite had been eroded away beginning at this voltage. The EC-PC-TFEA electrolyte was surprisingly resistant. With no upswing in current in the LSV up to 5.0 V vs. Li, the scan was repeated with a limit of 6 V vs. Li. No radical current excursion was seen. Thus the 1,1,1 trifluoroethyl acetate enhances the oxidation stability of the EC-PC solvent pair with $LiPF_6$ salt. TFP and FX-containing compositions also showed high anodic stability for use in lithium ion cells and batteries.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A liquid electrolyte suitable for use in a lithium ion cell or battery, said liquid electrolyte comprising:
   (a) a lithium salt; and
   (b) a solvent system, said solvent system comprising
      (i) a first aprotic solvent, said first aprotic solvent being a lithium ion solvating solvent; and
      (ii) a second aprotic solvent, said second aprotic solvent being a fluorinated solvent, wherein said second aprotic solvent is at least a partially fluorinated ring structure containing and opposite to an —S(O)$_n$ group, wherein n=1 and wherein the S atom of said —S(O)$_n$ group is a member of said partially fluorinated ring structure.

2. The liquid electrolyte as claimed in claim 1 wherein said lithium salt is a fluorinated lithium salt.

3. The liquid electrolyte as claimed in claim 2 wherein said fluorinated lithium salt is selected from the group consisting of $LiBF_4$, $LiAsF_6$ and $LiPF_6$.

4. The liquid electrolyte as claimed in claim 1 wherein said first aprotic solvent is selected from the group consisting of ethylene carbonate, propylene carbonate, and butylene carbonate.

5. The liquid electrolyte as claimed in claim 1 wherein said second aprotic solvent is a fluorinated solvent having a molecular dipole moment in excess of 4 Debye.

6. The liquid electrolyte as claimed in claim 1 wherein the second aprotic solvent constitutes about 20-60% of said solvent system.

7. The liquid electrolyte as claimed in claim 1 wherein said solvent system further comprises at least one fluorinated hydrocarbon liquid.

8. The liquid electrolyte as claimed in claim 7 wherein said fluorinated hydrocarbon liquid is selected from the group consisting of 2,3-dihydrodecafluoropentane; 1,1,1-trifluoropentanedione; trifluoroethyl acetate; and 1,2-hexafluoropentane-3,4-dione.

9. An electrochemical cell comprising the liquid electrolyte of claim 1, an anode, a cathode and a separator, the anode, the cathode and the separator being operatively associated with the liquid electrolyte, wherein the electrochemical cell is a lithium ion cell or battery.

10. A liquid electrolyte suitable for use in a lithium ion cell or battery, said liquid electrolyte comprising:
    (a) a lithium salt; and
    (b) a solvent system, said solvent system comprising
       (i) first aprotic solvent, said first aprotic solvent being a lithium ion solvating solvent; and
       (ii) a second aprotic solvent, said second aprotic solvent being a fluorinated solvent, wherein said second aprotic solvent is a compound of the general formula wherein n=1; $R_1$=H or F; $R_2$=H or F; $R_3$=H or F; and $R_4$=H or F, with at least one of $R_1$, $R_2$, $R_3$ and $R_4$ being F.

11. The liquid electrolyte as claimed in claim 10 wherein at least one of $R_2$ and $R_3$ is F.

* * * * *